United States Patent
Berestov et al.

(10) Patent No.: US 9,420,158 B2
(45) Date of Patent: Aug. 16, 2016

(54) SYSTEM AND METHOD FOR EFFECTIVELY IMPLEMENTING A LENS ARRAY IN AN ELECTRONIC DEVICE

(71) Applicant: SONY CORPORATION, Tokyo (JP)

(72) Inventors: Alexander Berestov, San Jose, CA (US); Chuen-Chien Lee, San Jose, CA (US); Hans Masli, Milpitas, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 67 days.

(21) Appl. No.: 13/752,580

(22) Filed: Jan. 29, 2013

(65) Prior Publication Data

US 2014/0016016 A1    Jan. 16, 2014

Related U.S. Application Data

(60) Provisional application No. 61/671,973, filed on Jul. 16, 2012.

(51) Int. Cl.
*H04N 13/02* (2006.01)
*H04N 5/232* (2006.01)
*H04N 5/225* (2006.01)

(52) U.S. Cl.
CPC ......... *H04N 5/23212* (2013.01); *H04N 5/2254* (2013.01); *H04N 13/0239* (2013.01); *H04N 13/0271* (2013.01); *H04N 13/0235* (2013.01)

(58) Field of Classification Search
CPC ....................................................... H04N 5/232
USPC ........................................ 348/345, 335, 218.1
See application file for complete search history.

(56) References Cited

U.S. PATENT DOCUMENTS

| | | | |
|---|---|---|---|
| 6,909,555 B2 | 6/2005 | Wohlstadter | |
| 2009/0102956 A1* | 4/2009 | Georgiev | 348/315 |
| 2009/0295829 A1* | 12/2009 | Georgiev et al. | 348/335 |
| 2010/0129048 A1* | 5/2010 | Pitts et al. | 348/345 |
| 2010/0141802 A1* | 6/2010 | Knight et al. | 348/240.3 |
| 2011/0176020 A1* | 7/2011 | Chang | 348/222.1 |
| 2011/0221599 A1* | 9/2011 | Hogasten | 348/218.1 |
| 2011/0234841 A1* | 9/2011 | Akeley et al. | 348/222.1 |
| 2012/0050562 A1 | 3/2012 | Perwass et al. | |
| 2012/0287331 A1* | 11/2012 | Iwane | 348/360 |

* cited by examiner

*Primary Examiner* — Gevell Selby
(74) *Attorney, Agent, or Firm* — O'Banion & Ritchey LLP; John P. O'Banion (57) ABSTRACT

A system for implementing and utilizing a lens array in an electronic device includes a sensor array coupled to the electronic device for capturing image data corresponding to a photographic target. The lens array includes a plurality of lenses that each has a different respective principal focal length to transmit reflected light from the photographic target to the sensor array. The sensor array captures a set of MFP images that each corresponds with a respective one of the lenses in the MFP lens array. The electronic device may further include an image processor that performs one or more digital signal processing procedures on the captured MFP images to thereby generate a rendered final image.

1 Claim, 12 Drawing Sheets

SYSTEM AND METHOD FOR EFFECTIVELY IMPLEMENTING A LENS ARRAY IN AN ELECTRONIC DEVICE

CROSS-REFERENCE TO RELATED APPLICATIONS

This application claims priority in U.S. Provisional Patent Application No. 61/671,973 entitled "Multiple Focal Point Light Field Camera" that was filed on Jul. 16, 2012. The foregoing related application is commonly assigned, and is hereby incorporated by reference.

BACKGROUND SECTION

1. Field of the Invention

This invention relates generally to techniques for capturing image data, and relates more particularly to a system and method for effectively implementing a lens array in an electronic device.

2. Description of the Background Art

Implementing effective methods for capturing image data is a significant consideration for designers and manufacturers of contemporary electronic devices. However, effectively capturing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that captures digital image data may benefit from an effective implementation because of the large amount and complexity of the digital data involved.

Due to growing demands on system resources and substantially increasing data magnitudes, it is apparent that developing new techniques for capturing image data is a matter of concern for related electronic technologies. Therefore, for all the foregoing reasons, developing effective systems for capturing image data remains a significant consideration for designers, manufacturers, and users of contemporary electronic devices.

SUMMARY

In accordance with the present invention, a system and method are disclosed for effectively implementing a multiple-focal-point (MFP) lens array in an electronic device. In one embodiment, an appropriate entity initially implements the MFP lens array in a digital camera device in any effective manner. For example, the MFP lens array may be implemented with nine lenses arranged in a 3×3 matrix. In other embodiments, any appropriate number of lenses in any effective configuration is equally contemplated.

In accordance with the present invention, each of the lenses has a different principal focal length. The respective principal focal lengths may be selected to focus at any desired focal distance. Each lens in the MFP lens array captures substantially the entire photographic target or scene. In certain embodiments, each lens of the MFP lens array transmits light to a different respective pixel block of a sensor.

The sensor captures discrete MFP images that corresponding to the same or similar photographic target. However, each of the MFP images has a different respective focal point based upon the particular associated lens from the MFP lens array. In certain embodiments, an image processor or other appropriate entity may perform one or more desired digital signal processing procedures on the captured MFP images to thereby generate a rendered final image. The rendered final image may then be stored into memory for subsequent utilization by a device user. The present invention therefore provides an improved system and method for effectively implementing and utilizing an MFP lens array in an electronic device.

DETAILED DESCRIPTION

The present invention relates to an improvement in image capture techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for implementing and utilizing a lens array in an electronic device, and includes a sensor array coupled to the electronic device for capturing image data corresponding to a photographic target. The lens array includes a plurality of lenses that each has a different respective principal focal length to transmit reflected light from the photographic target to the sensor array. The sensor array captures a set of images that each corresponds with a respective one of the lenses in the lens array. The electronic device may further include an image processor that performs one or more digital signal processing procedures on the captured images to thereby generate a rendered final image.

Figure 1:
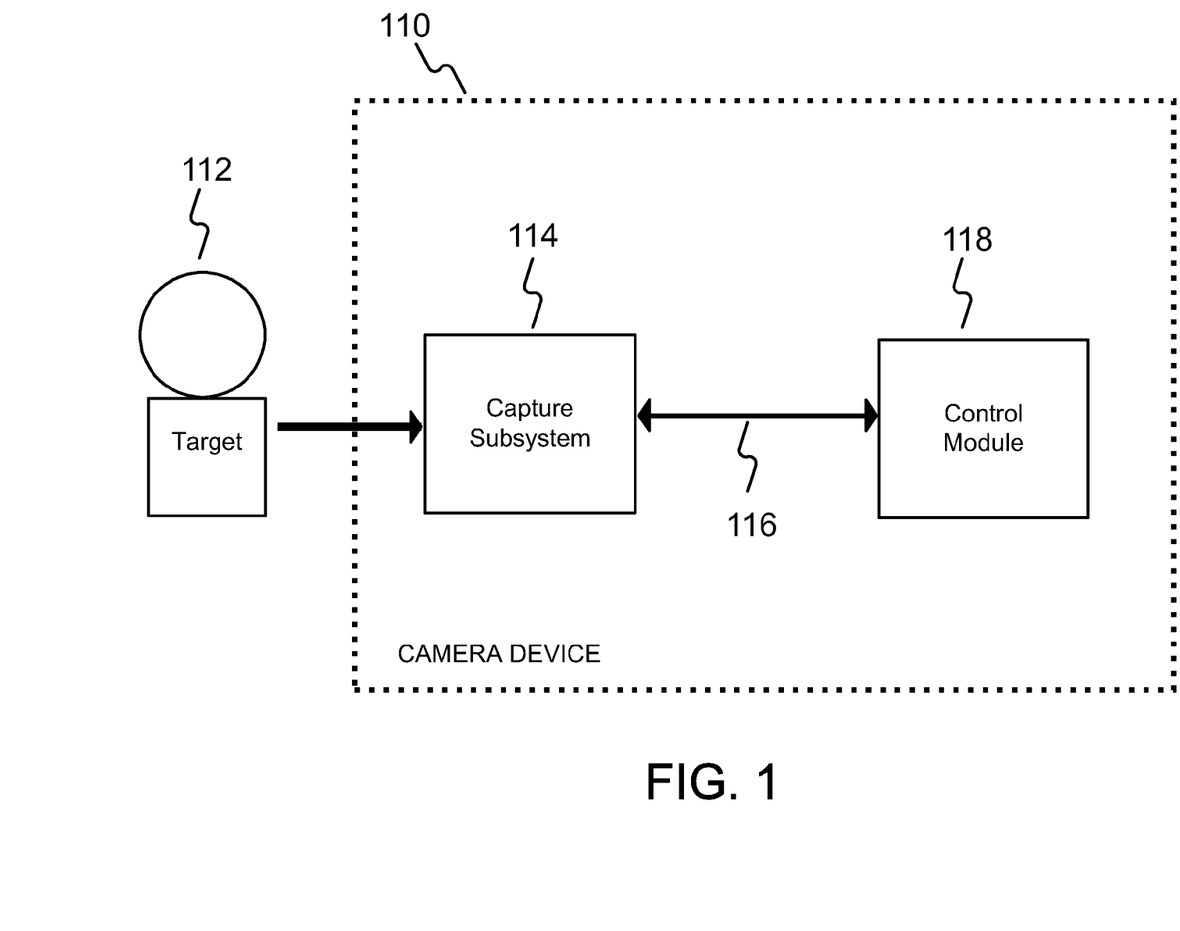
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be pointed at a photographic target 112, and may also be electrically coupled via system bus 116 to control module 118.

In alternate embodiments, camera device 110 may include various components in addition to, or instead of, certain of those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device such as a smart phone or a tablet PC.

In the FIG. 1 embodiment, once a system user has framed capture subsystem 114 on target 112 and requested camera device 110 to capture image data corresponding to target 112, then control module 118 may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
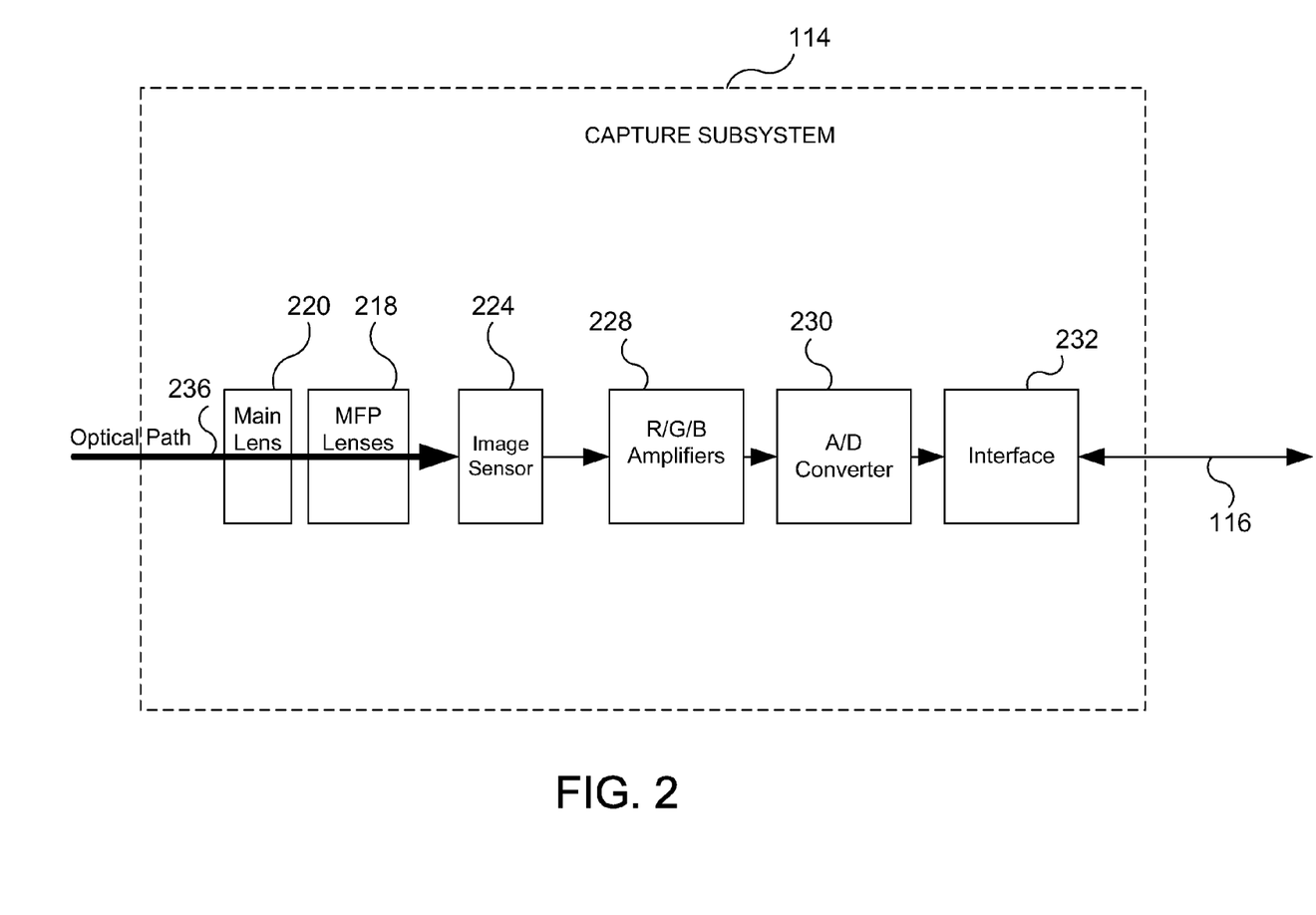
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 comprises, but is not limited to, a main lens 220, a multiple-focal-point (MFP) lens array 218, an image sensor 224, red, green, and blue (R/G/B) amplifiers 228, an analog-to-digital (A/D) converter 230, and an interface 232. In alternate embodiments, capture subsystem 114 may include various components in addition to, or instead of, certain of those components discussed in conjunction with the FIG. 2 embodiment.

In the FIG. 2 embodiment, capture subsystem 114 may capture image data corresponding to a photographic target or scene via reflected light impacting image sensor 224 along optical path 236 through main lens 220 and MFP lenses 218. Image sensor 224, which may include a charged-coupled device (CCD), may responsively generate a set of image data representing the photographic target. The image data may then be routed through red, green, and blue amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of MFF lenses 218 is further discussed below in conjunction with FIGS. 3-10.

Figure 3:
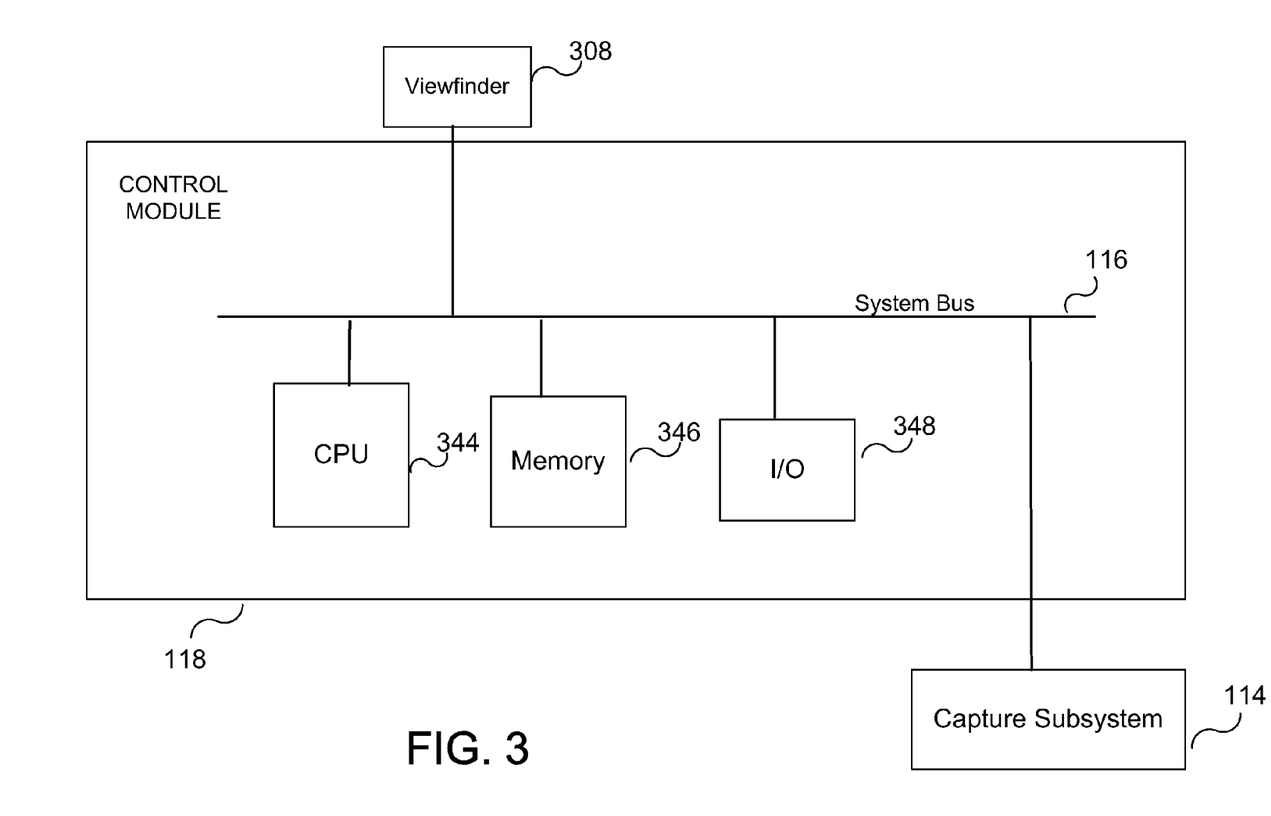
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 includes, but is not limited to, a viewfinder 308, a central processing unit (CPU) 344, a memory 346, and one or more input/output interface(s) (I/O) 348. Viewfinder 308, CPU 344, memory 346, and I/O 348 are each coupled to, and communicate, via common system bus 116 that also communicates with capture subsystem 114. In alternate embodiments, control module 118 may include components in addition to, or instead of, certain of those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 10.

Figure 4:
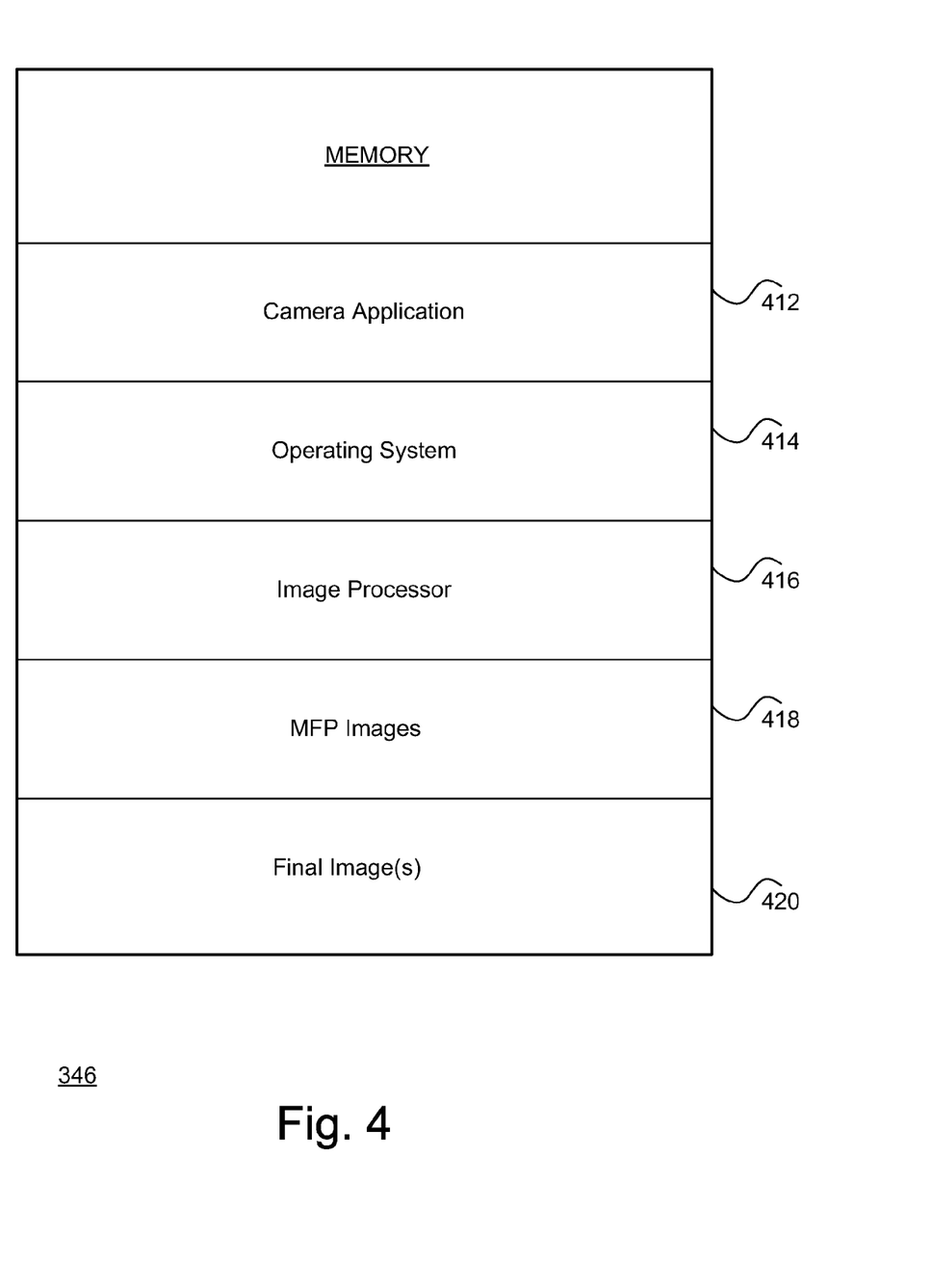
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, an image processor 416, multiple-focal-point (MFP) images 418, and one or more final image(s) 420. In alternate embodiments, memory 346 may include components in addition to, or instead of, certain of those components discussed in conjunction with the FIG. 4 embodiment.

In the FIG. 4 embodiment, camera application 412 may include program instructions that are executed by CPU 344 (FIG. 3) to perform various functions and operations for camera device 110. The particular nature and functionality of camera application 412 typically varies depending upon factors such as the type and particular use of the corresponding camera device 110.

In the FIG. 4 embodiment, operating system 414 controls and coordinates low-level functionality of camera device 110. In accordance with the present invention, image processor 416 may control and coordinate various appropriate image processing procedures to generate the final images 420 from the MFP images 418. The capture and processing of MFP images 418 to create final images 420 are further discussed below in conjunction with FIGS. 5-10.

Figure 5:
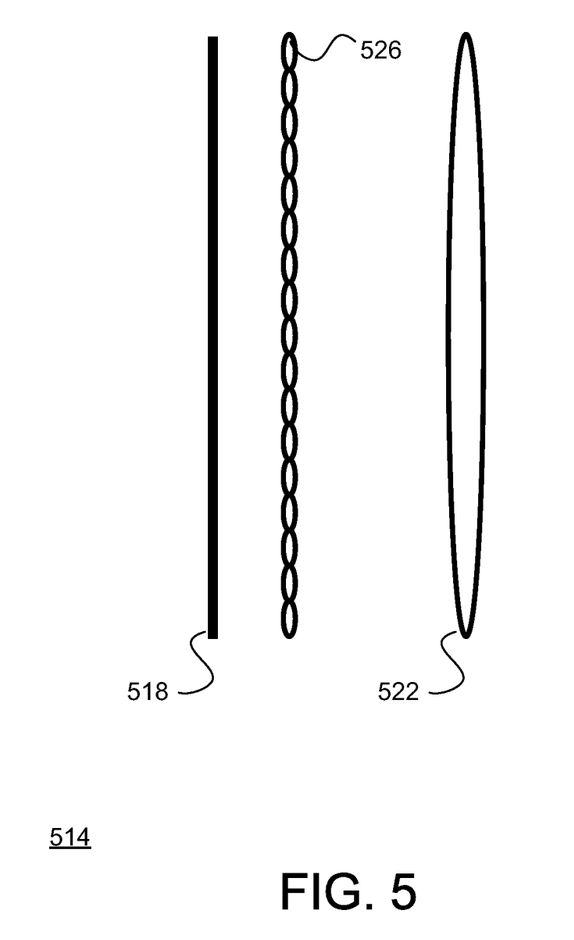
FIG. 5 is a side view for one embodiment of a light-field camera capture subsystem.

Referring now to FIG. 5, a side view for one embodiment of a light-field camera capture subsystem 514 is shown. The FIG. 5 subsystem 514 includes a sensor 518, an intermediate lens array 526, and a main lens 522. In alternate embodiments, light-field cameras may utilize configurations and elements other than certain of those shown in the FIG. 5 embodiment.

In the FIG. 5 embodiment, intermediate lens array 526 includes multiple small lenses that each transmit light to respective pixel blocks on sensor 518. One or more pixels from each pixel block may then be combined to create a complete image of the photographic target. Each of the lenses in intermediate lens array 526 has identical optical properties including the same focal distance. The light-field camera capture subsystem 514 of FIG. 5 has several distinct disadvantages. The resultant captured image has low resolution and a narrow angle of capture. In addition, light-field camera capture subsystem 514 requires high illumination for capturing images.

Figure 6:
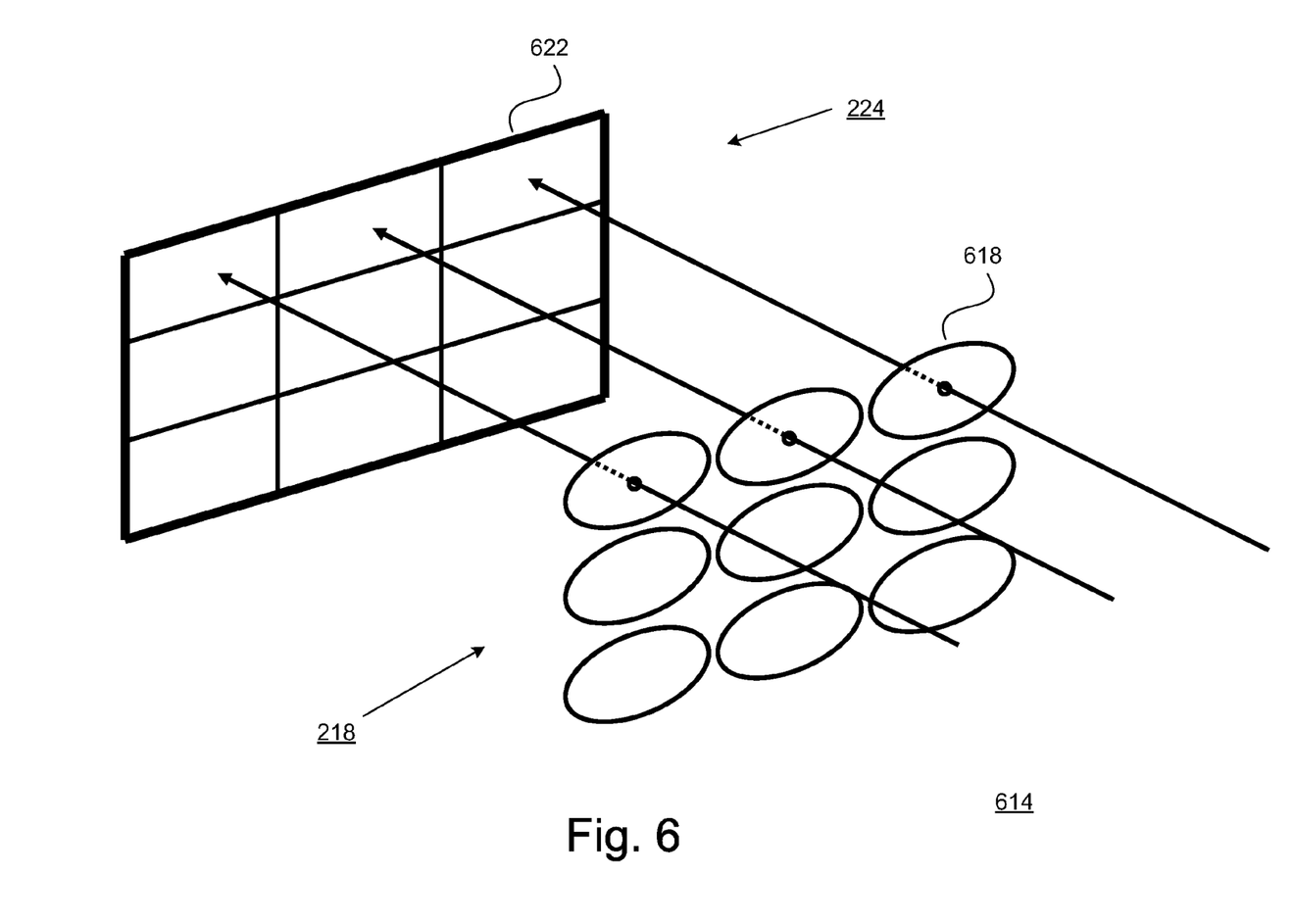
FIG. 6 is an elevation view of a multiple-focal-point (MFP) capture subsystem, in accordance with one embodiment of the present invention.

Referring now to FIG. 6, an elevation view of a multiple-focal-point (MFP) capture subsystem 614 is shown, in accordance with one embodiment of the present invention. The FIG. 6 embodiment includes a multiple-focal-point (MFP) lens array 218 and a sensor 224. The FIG. 6 embodiment is presented for purposes of illustration, and in alternate embodiments, MFP capture subsystems 614 may be implemented by utilizing elements, configurations, and techniques other than certain of those discussed in conjunction with the FIG. 6 embodiment.

In the FIG. 6 embodiment, MFP lens array 218 is implemented with nine lenses arranged in a 3×3 matrix. In other embodiments, any appropriate number of lenses in any effective configuration are equally contemplated. In accordance with the present invention, each of the lenses has a different principal focal length. The respective focal distances may be selected to focus on any desired location. Each lens in MFP lens array 218 captures the entire photographic target or scene.

In the FIG. 6 embodiment, each lens of MFP lens array 218 transmits light to a different respective pixel block of sensor 224. For example, lens 618 transmits light to pixel block 622. Sensor 224 therefore detects nine sets of image data corresponding to the same or similar photographic target. However, each set of image data has a different respective focal point based upon the particular associated lens from MFP lens array 218. In accordance with the present invention, the sets of image data may then be processed to generate one or more rendered final images. Various techniques for implementing and utilizing MFP lenses 218 are further discussed below in conjunction with FIGS. 7-10.

Figure 7:
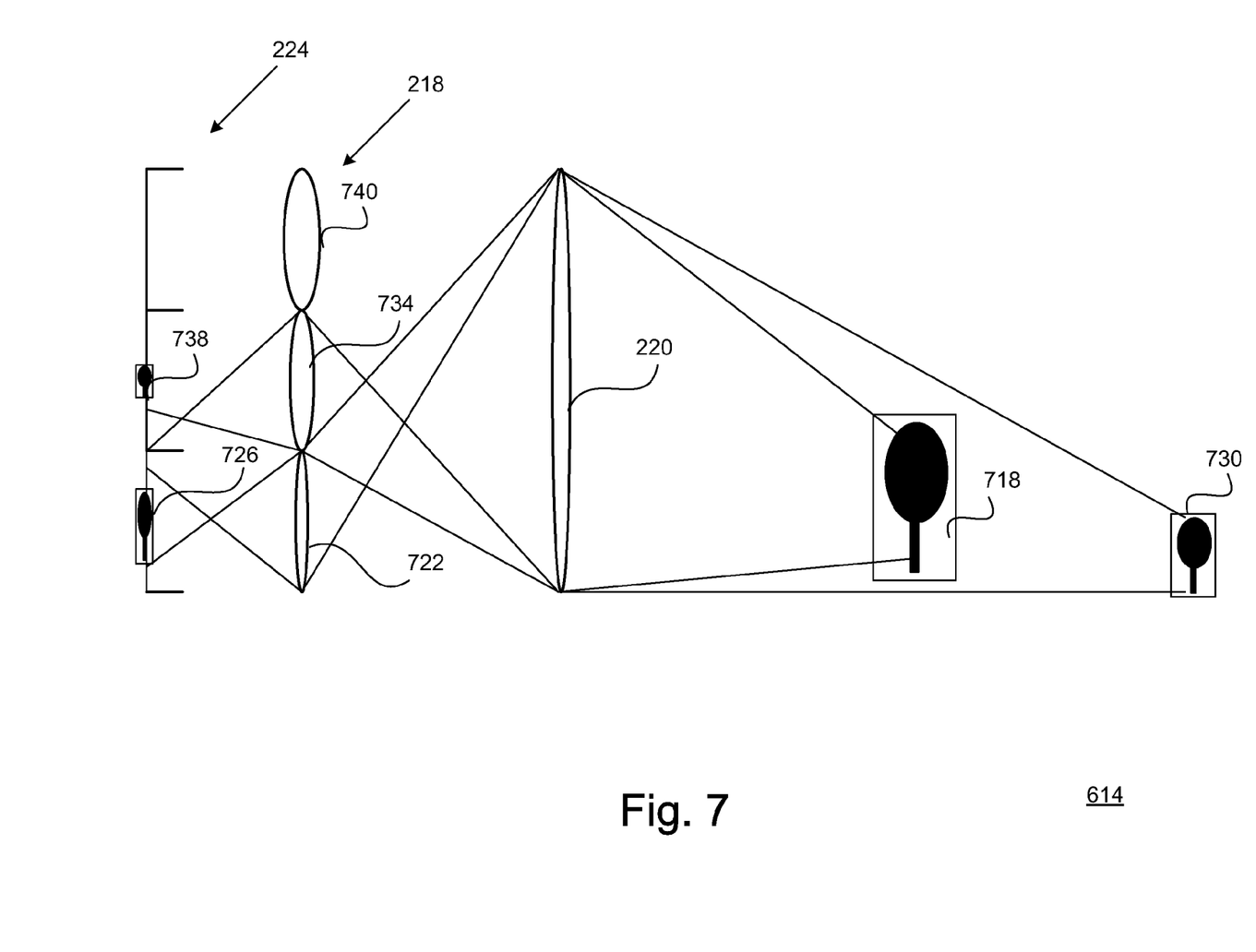
FIG. 7 is a side view of an MFP capture subsystem of FIG. 6, in accordance with one embodiment of the present invention.

Referring now to FIG. 7, a side view of the FIG. 6 MFP capture subsystem 614 is shown, in accordance with one embodiment of the present invention. The FIG. 7 embodiment includes a multiple-focal-point (MFP) lens array 218, a main lens 220, and a sensor 224. The FIG. 7 embodiment is presented for purposes of illustration, and in alternate embodiments, MFP capture subsystems may be implemented to include various configurations and elements in addition to, or instead of, certain of those configurations and elements discussed in conjunction with the FIG. 7 embodiment. For example, in certain embodiments, main lens 220 may be omitted, or may be positioned between sensor 224 and MFP lens array 218.

In the FIG. 7 embodiment, a large tree 718 is located at the focal distance of lens 722. Light reflected from tree 718 passes through main lens 220 and is focused by lens 722 of MFP lens array 218 on pixel block 726 of sensor 224. In the FIG. 7 embodiment, a small tree 730 is located at the focal distance of lens 734. Light reflected from tree 730 passes through main lens 220 and is focused by lens 734 of MFP lens array 218 on pixel block 738 of sensor 224. Various techniques for implementing and utilizing MFP lenses 218 are further discussed below in conjunction with FIGS. 8-10.

Figure 8A:
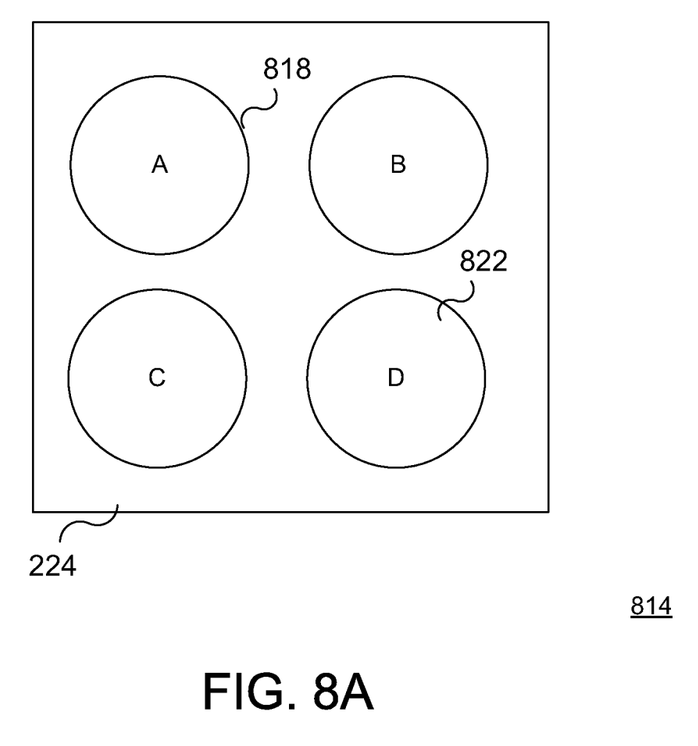
FIG. 8A is a frontal view of an MFP capture subsystem, in accordance with one embodiment of the present invention.
Figure 8B:
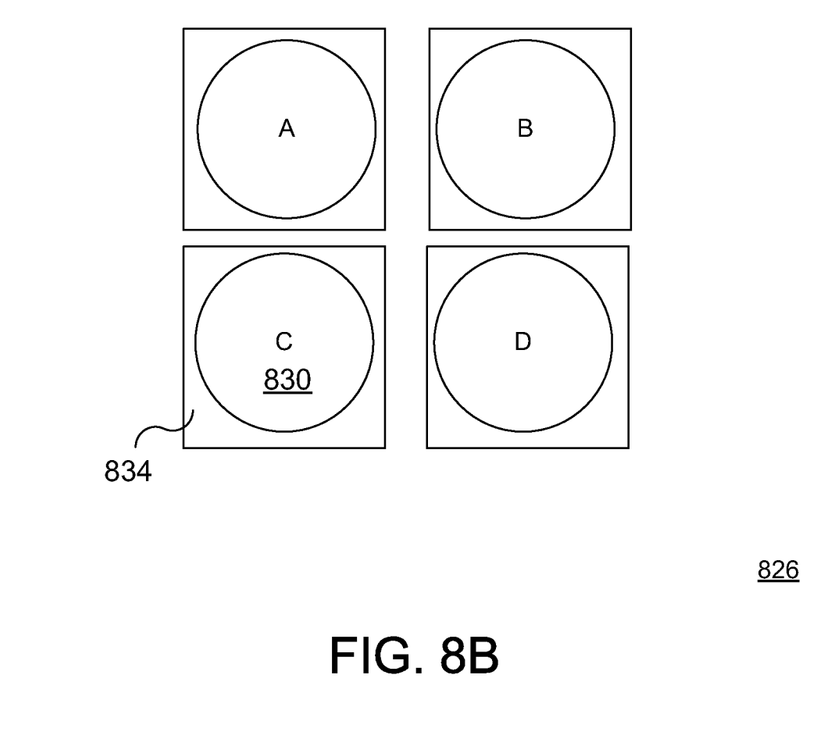
FIG. 8B is a frontal view of an MFP capture subsystem, in accordance with one embodiment of the present invention.
Figure 8C:
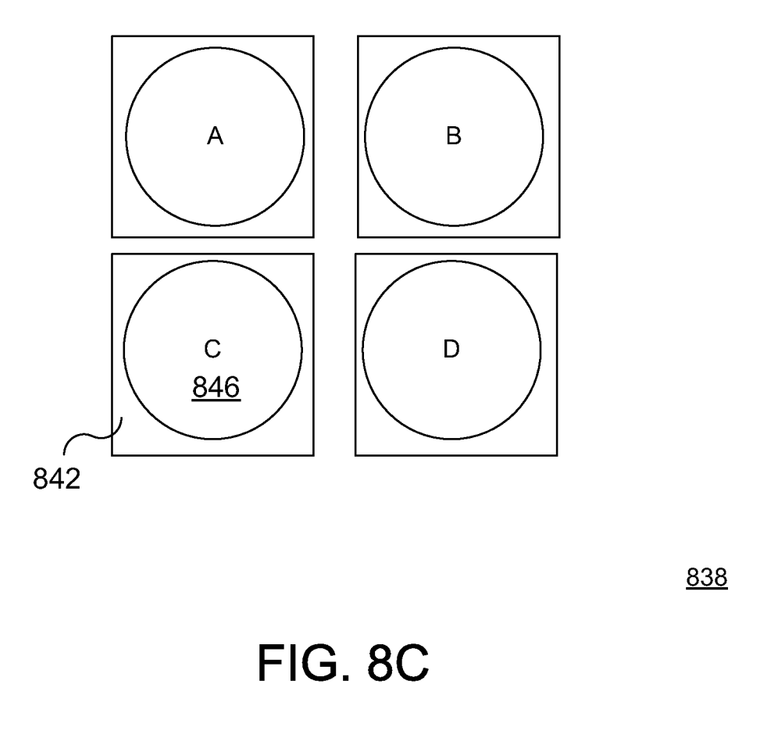
FIG. 8C is a frontal view of an MFP capture subsystem, in accordance with one embodiment of the present invention.

Referring now to FIGS. 8A-8C, frontal views of MFP capture subsystems 814, 826, and 836 are shown, in accordance with several embodiments of the present invention. The FIG. 8 embodiments are presented for purposes of illustration, and in alternate embodiments, the present invention may configure MFP capture subsystems by utilizing techniques and elements other than certain of those discussed in conjunction with the FIG. 8 embodiments. For example, any desired number and configuration of lenses may be utilized.

In the FIG. 8A embodiment, an MFP capture subsystem 814 (which is similar to the FIG. 6 embodiment) includes an MFP lens array of four lenses A (818) through D (822) that each focus the photographic target on a respective pixel block of a single sensor 224. In the FIG. 8A embodiment, each lens has a different principal focal length due to the optical characteristics of the lens or the physical position of the lens with respect to the other components.

In the FIG. 8B embodiment, an MFP capture subsystem 826 includes an MFP lens array of four individual camera units that each has a lens and corresponding small sensor. For example, lens C (830) focuses the photographic target on the discrete sensor 834. In the FIG. 8B embodiment, the four lenses are non-identical to provide the multiple focal distances for corresponding captured image data. In the FIG. 8B embodiment, each lens has a different principal focal length due to the optical characteristics of the lenses.

In the FIG. 8C embodiment, an MFP capture subsystem 838 includes an MFP lens array of four individual camera units that each has a lens and corresponding small sensor. For example, lens C (846) focuses the photographic target on the discrete sensor 842. In the FIG. 8C embodiment, the four lenses are identical, but may be physically positioned to provide the multiple focal distances for corresponding captured image data. In the FIG. 8C embodiment, each lens therefore has a different focal distance due to the physical position of the lens with respect to the other components. The implementation and utilization MFP lens arrays are further discussed below in conjunction with FIGS. 9-10.

Figure 9:
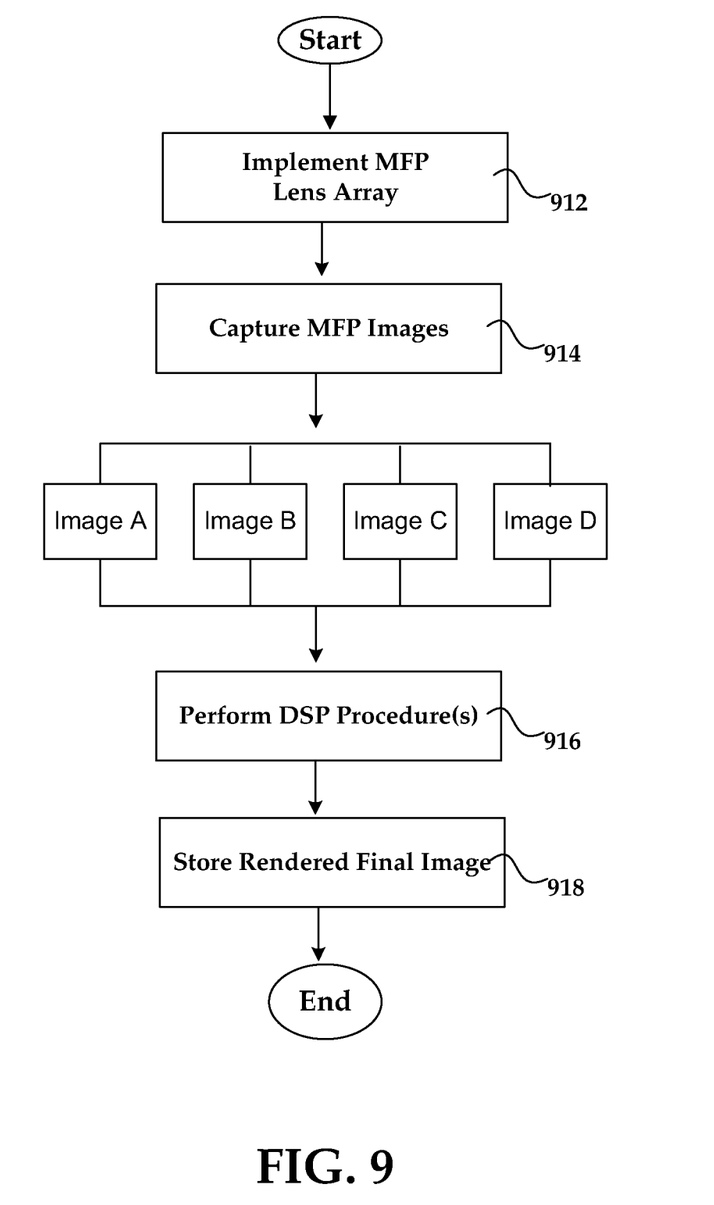
FIG. 9 is a flowchart of method steps for utilizing an MFP lens array, in accordance with one embodiment of the present invention.

Referring now to FIG. 9, a flowchart of method steps for utilizing an MFP lens array 218 is shown, in accordance with one embodiment of the present invention. The FIG. 9 embodiment is presented for purposes of illustration, and in alternate embodiments, the present invention may utilize steps and sequences than certain of those discussed in conjunction with the FIG. 9 embodiment.

In step 912 of the FIG. 9 embodiment, an appropriate entity may initially implement a multiple-focal-point (MFP) lens array 218 (FIG. 6) in any effective manner. For example, the MFP lens array 218 may be implemented with nine lenses arranged in a 3×3 matrix. In other embodiments, any appropriate number of lenses in any effective configuration are equally contemplated.

In accordance with the present invention, each of the lenses has a different principal focal length. The respective focal distances may be selected to focus on any desired focal points. Each lens in MFP lens array 218 captures substantially the entire photographic target or scene. Each lens of MFP lens array 218 transmits light to a different respective pixel block of a sensor 224 (FIG. 2).

In step 914, the sensor 224 captures MFP images that include nine sets of image data corresponding to the same or similar photographic target. However, each set of image data has a different respective focal point based upon the particular associated lens from MFP lens array 218. In the FIG. 9 example, four MFP images A-D are shown for purposes of illustration.

In step 916, an image processor 416 or other appropriate entity performs one or more desired digital signal processing (DSP) procedures on the captured MFP images to thereby generate a rendered final image. In step 918, the rendered final image may then be stored for subsequent utilization by a device user. The FIG. 9 procedure may then terminate. The present invention therefore provides an improved system and method for effectively implementing and utilizing an MFP lens array in an electronic device.

Figure 10:
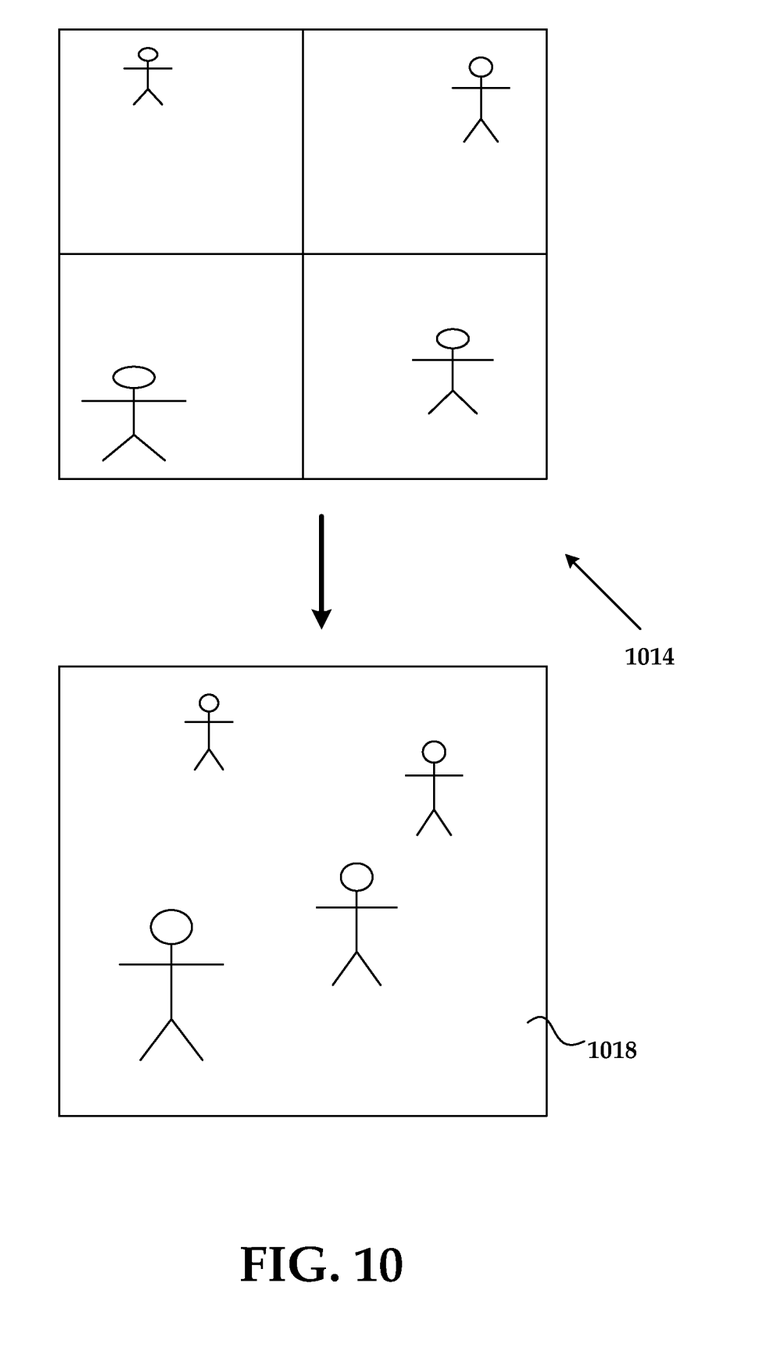
FIG. 10 is a drawing illustrating an enhanced image-rendering procedure, in accordance with one embodiment of the present invention.

Referring now to FIG. 10, a drawing illustrating an enhanced image-rendering procedure is shown, in accordance with one embodiment of the present invention. The FIG. 10 embodiment is presented for purposes of illustration, and in alternate embodiments, image rendering may be performed by utilizing various techniques, configurations, and elements in addition to, or instead of, certain of those techniques, configurations, and elements discussed in conjunction with the FIG. 10 embodiment.

In the FIG. 10 embodiment, a set of four MFP images 1014 are shown that each has a different focal distance due to the MFP lens array 218 discussed previously. For purposes of illustration, the MFP images 1014 each shows a different respective figure that is in-focus at that corresponding focal distance. For purposes of simplicity, any out-of-focus image data is omitted. In accordance with one embodiment of the present invention, an image processor 416 (FIG. 4) may perform an extended depth-of-field rendering procedure on the captured MFP images 1014 to thereby generate a rendered final image 1018 that includes all four in-focus figures combined into a single image.

In accordance with other embodiments of the present invention, image processor 416 may also perform various other image processing procedures with MFP images 1014. For example, a super resolution procedure may be performed to combine each of the MFP images 1014 into a single final image 1018 that is larger, but still retains the same resolution characteristics. A refocusing procedure may also be performed to provide a smooth transition between images focused at different depths.

In addition, providing images for depth map calculations may be readily performed with only a single image capture event for MFP images 1014. Furthermore, high-quality 3D imaging procedures may be supported. For example, a 2D image plus a depth map may be utilized to generate a 3D image at long distances, or a stereoscopic pair of images may be utilized to generate a 3D image at short distances due to the slight offset between lenses in the MFP lens array 218.

The present invention advantageously facilitates producing rendered images that have high resolution and wide capture angles. The MFP images may also be captured under low-light conditions. For all of these reasons, the present invention therefore provides an improved system and method for effectively implementing and utilizing an MFP lens array in an electronic device.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing an electronic device, comprising:
a sensor array coupled to said electronic device for capturing image data corresponding to a photographic target; and
an MFP lens array that includes a plurality of lenses that each has a different respective principal focal length, said lenses transmitting reflected light from said photographic target to said sensor array, said sensor array and said MFP lens array being implemented in a capture subsystem of an imaging device, said imaging device causing said sensor array to capture a set of MFP images through said MFP lens array, an image processor of said imaging device performing a digital signal processing procedure upon said MFP images to generate at least one rendered final image, said image processor utilizing two of said MFP images as a stereoscopic pair to generate a three-dimensional image at short focal distances due to a slight offset between said lenses in said MFP lens array.

* * * * *